United States Patent Office 2,836,627
Patented May 27, 1958

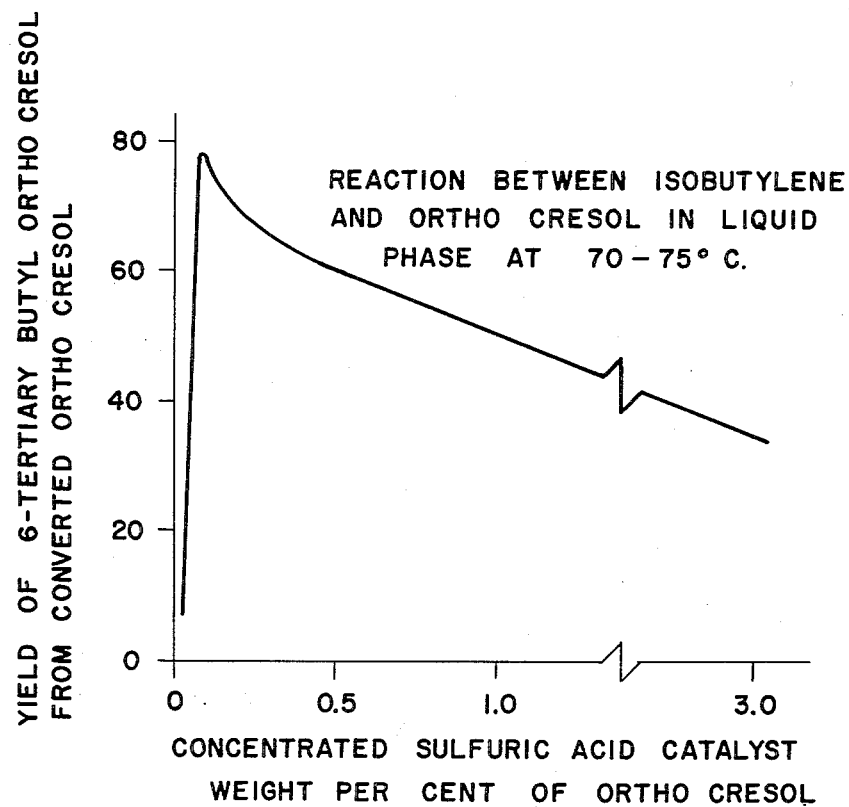

2,836,627

PREPARATION OF 6-TERTIARY BUTYL ORTHOCRESOL

Martin B. Neuworth, Eric B. Hotelling, and Elizabeth A. Depp, Pittsburgh, Pa., assignors to Pittsburgh Consolidation Coal Company, Pittsburgh, Pa., a corporation of Pennsylvania Application January 5, 1956, Serial No. 557,544

2 Claims. (Cl. 260—624)

The present invention relates to a method for preparing 6-tertiary butyl ortho-cresol and, more particularly, to a method of butylating ortho-cresol selectively in the sixth position of its aromatic ring.

The reaction of isobutylene and ortho-cresol has been shown by previous investigators to be effective in producing tertiary butyl ortho-tolyl ether when trace quantities of concentrated sulfuric acid are used as catalyst. The use of larger quantities of concentrated sulfuric acid as catalyst can produce monobutylated ortho-cresol, principally 4-tertiary butyl ortho-cresol.

At the present time, there is no known utility for the 4-tertiary butyl ortho-cresol. There is, however, utility for 6-tertiary butyl ortho-cresol which, because of its two alkyl groups in the ortho positions, is a hindered phenol possessing properties desired in antioxidants for rubber, gasoline and the like.

We believe we are the first persons to discover reaction conditions which result in the selective production of 6-tertiary butyl ortho-cresol from the liquid phase reaction of isobutylene and ortho-cresol in the presence of intermediate quantities of concentrated sulfuric acid as catalyst. According to this invention, a reaction mixture of ortho-cresol containing from 0.08 to 2.5% by weight of concentrated sulfuric acid is prepared. Up to about 1 mol of isobutylene is passed through the reaction mixture for each mol of ortho-cresol at a temperature in the range of about 20 to 100° C. When substantially complete absorption (i. e., butylation) has occurred, the butylate is stabilized by washing with dilute caustic to neutralize the catalyst and prevent rearrangement of the desired 6-tertiary butyl ortho-cresol into 4-tertiary butyl ortho-cresol.

By the method of the present invention upwards of 50% of the converted ortho-cresol appears as the desired 6-tertiary butyl ortho-cresol. Production of tertiary butyl ortho-tolyl ether is substantially eliminated and the yield of dibutylated ortho-cresol is minimized.

We have found in addition a narrow range of conditions which results in even more selective production of the desired 6-tertiary butyl ortho-cresol, permitting yields of 70 percent and more of the converted ortho-cresol. These more selective conditions obtain at temperatures in the range from about 70 to 100° C. with from about 0.08 to about 1.0 percent by weight of concentrated sulfuric acid. The application of elevated pressures improves the selectivity by increasing the rate of reaction between isobutylene and ortho-cresol under these conditions.

While it is preferred for convenience to carry out the reaction of the present invention at atmospheric pressure, nevertheless subatmospheric or superatmospheric pressures may be employed. Slightly elevated pressures tend to favor selectivity of the reaction.

The desired reaction is sensitive to the quantity of concentrated sulfuric acid employed as a catalyst. By the phrase "concentrated sulfuric acid" we intend 93–98% sulfuric acid, although concentrations as low as about 90% are satisfactory. The reaction is carried out by passing isobutylene through a liquid phase reaction mixture containing ortho-cresol and concentrated sulfuric acid catalyst. The maximum quantity of concentrated sulfuric acid is about 2.5% by weight of the ortho-cresol. Greater quantities of concentrated sulfuric acid in the reaction mixture result in the selective formation of 4-tertiary butyl ortho-cresol instead of the desired 6-tertiary butyl ortho-cresol. The minimum amount of concentrated sulfuric acid in the reaction mixture may be as low as 0.08% by weight at elevated temperatures in the permissible reaction range of about 20 to 100° C. At lower temperatures within the permissible reaction temperature range, greater quantities of concentrated sulfuric acid are required. About 0.4 weight percent of concentrated sulfuric acid is the minimum quantity for the desired reaction at the lowest temperatures within the reaction range of about 20 to 100° C. Insufficient quantities of concentrated sulfuric acid catalyst result in the formation of tertiary butyl ortho-tolyl ether at temperatures below about 65° C. At temperatures above about 65° C., the ortho-cresol is substantially unreacted in the absence of insufficient quantities of concentrated sulfuric acid catalyst.

Ten examples which follow illustrate the present invention. In these examples, a five liter flask fitted with a stirring device was employed as the reaction vessel. The ortho-cresol reactant was introduced into the flask. Concentrated sulfuric acid (96%) was introduced into the reaction vessel and mixed with the ortho-cresol to form a reaction mixture which was heated to the initial reaction temperature within the range of about 20 to 100° C. as indicated for each example in Table 1. The quantity of concentrated sulfuric acid based on the weight of ortho-cresol is listed in Table 1 as a percentage by weight. Isobutylene was introduced into the heated reaction vessel at a substantially uniform rate over the period of time listed in Table 1 as reaction time. The isobutylene feed rate was not entirely constant, but instead, was adjusted to prevent continuing exothermic butylation from raising the temperature of the reaction vessel above the desired value listed for each example in Table 1. The added weight of the reaction vessel is reported in Table 1 as the quantity of isobutylene picked up in the reaction flask.

When the desired quantity of the isobutylene had reacted with the ortho-cresol, the feed stream of isobutylene was shut off and a quantity of 10% aqueous sodium hydroxide was added to the reaction flask to neutralize the concentrated sulfuric acid and prevent rearrangement of the alkylate. The quantity of sodium hydroxide solution was slightly in excess of the stoichiometric amount required to neutralize the acid. Toluene was added to promote phase separation and the aqueous phase removed. The aqueous phase contains inorganic salts and aqueous soluble organic materials. The desired 6-tertiary butyl ortho-cresol is recovered from the non-aqueous phase by vacuum distillation following an azeotropic drying treatment.

Table 1

BUTYLATION OF O-CRESOL, ONE ATMOSPHERE PRESSURE

| Run Designation | Temperature, °C | O-Cresol Charge, grams | Wt. Percent Conc. $H_2SO_4$ | Absorbed Isobutylene, grams | Reaction Time, hours | Conversion, Wt. Percent O-Cresol Feed | Products, Wt. Percent of Converted O-Cresol | | |
|---|---|---|---|---|---|---|---|---|---|
| | | | | | | | 6-t-Butyl O-Cresol | 4-t-Butyl O-Cresol | Residue [1] |
| A | 70–75 | 3,180 | 5.0 | 271 | 2.5 | 17 | 19 | 75 | 6 |
| B | 70–75 | 3,488 | 3.0 | 450 | 3.5 | 26 | 35 | 50 | 15 |
| C | 70–75 | 3,375 | 1.0 | 265 | 6.0 | 16 | 52 | 36 | 12 |
| D | 70–75 | 2,418 | 0.5 | 231 | 2.5 | 16 | 60 | 30 | 10 |
| E | 70–75 | 2,685 | 0.1 | 327 | 2.5 | 17 | 77.5 | 14.5 | 8 |
| F | 70–75 | 2,641 | 0.02 | 21 | 2.0 | 0.3 | | | |

BUTYLATION OF O-CRESOL UNDER PRESSURE (0–23 p. s. i. g.)

| Run Designation | Temperature, °C | O-Cresol Charge, grams | Wt. Percent Conc. $H_2SO_4$ | Absorbed Isobutylene, grams | Reaction Time, hours | Conversion, Wt. Percent O-Cresol Feed | 6-t-Butyl O-Cresol | 4-t-Butyl O-Cresol | Residue [1] |
|---|---|---|---|---|---|---|---|---|---|
| G | 70–75 | 1,000 | 1.0 | 95 | 1.3 | 19 | 53 | 27 | 20 |
| H | 50–75 | 1,002 | 1.0 | 171 | 2.1 | 34 | 53 | 24 | 23 |
| I | 25–60 | 1,000 | 2.0 | 184 | 1.7 | 36 | 50 | 26 | 24 |
| J [2] | 45–50 | 3,753 | 1.0 | | 1.0 | 72 | 54 | 10 | 29 |

[1] The residue includes 4,6-ditertiary butyl ortho-cresol, higher boiling material, tars and salts.
[2] Run J conducted at 40 p. s. i. g. pressure; the distillate contained about 6 percent of unidentified material.

From Table 1 it is seen that the present butylation process can produce upwards of 50 percent of converted ortho-cresol as 6-tertiary butyl ortho-cresol through control of the quantity of concentrated sulfuric acid catalyst. See Examples C, D, E, G, H and I. Examples A and B demonstrate that the yield of 6-tertiary butyl ortho-cresol is decreased when excessive concentrated sulfuric acid is used. Example F demonstrates that the conversion of ortho-cresol is negligible when insufficient concentrated sulfuric acid is used.

The attached drawing is a graphical illustration of the variation of yield of the desired 6-tertiary butyl ortho-cresol (expressed as wt. percent of converted ortho-cresol) with respect to the quantity of concentrated sulfuric acid present as catalyst (expressed as wt. percent of the ortho-cresol charge). The data plotted in the drawing are derived from runs B, C, D, E and F of Table 1 to illustrate the unexpected increase in 6-position butylation obtained in the narrow range from about 0.08 to about 1.0 weight percent sulfuric acid catalyst at temperatures from about 70 to 100° C. Application of moderate elevated pressures would increase the yield of desired product. Excessive elevated pressures result in dimerization of the isobutylene and should be avoided.

The butylate of this process contains unreacted ortho-cresol, 6-tertiary butyl ortho-cresol, 4-tertiary butyl ortho-cresol, 4,6-ditertiary butyl ortho-cresol, some octene resulting from alkylation of the isobutylene itself, and a negligible quantity of high boiling unidentified residue. Under the described conditions, no tertiary butyl ortho-tolyl ether was detected. The yield of dibutylated ortho-cresol is minimized by providing reduced quantities of isobutylene per mol of ortho-cresol for the reaction. The conversion of ortho-cresol feed is preferably less than about 50 percent per batch to avoid the production of these dibutylated materials.

The isobutylene is introduced into the ortho-cresol reaction mixture at a rate corresponding to its rate of reaction to prevent accumulation of unreacted isobutylene, thereby to avoid auto-alkylation of the isobutylene. However, the reaction should be carried out as quickly as possible to minimize the yield of the non-desired 4-tertiary butyl ortho-cresol. When the desired quantity of isobutylene has been reacted, the reaction mixture should be stabilized quickly by eliminating the reaction-promoting conditions, preferably by destroying the effectiveness of the concentrated sulfuric acid as catalyst through neutralization. Continued exposure of the butylate to the reaction-promoting conditions results in some rearrangement of the desired 6-tertiary butyl ortho into 4-tertiary butyl ortho-cresol.

Example J illustrates the overall improvement in the present process which results from moderate elevated pressures. In Example J, 72 percent of the ortho-cresol was converted into products comprising 54 percent of the desired 6-tertiary butyl ortho-cresol. The significant increase in yield of dibutylated products is characteristic of elevated pressure effects. However the ratio of 6-position to 4-position butylated ortho-cresol is 5.4. In general, we prefer slightly elevated pressures up to about the minimum pressures required to maintain isobutylene in the liquid phase at the temperature of reaction. At 100° C., for example, this minimum pressure is about 20 atmospheres.

According to the provisions of the Patent Statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. The method of preparing 6-tertiary butyl ortho-cresol which comprises passing up to one molar equivalent of isobutylene into contact with ortho-cresol containing from about 0.08 to about 1.0 percent by weight of concentrated sulfuric acid at temperatures in the range of 70 to 100° C., the amount of sulfuric acid being varied depending upon the temperature employed, smaller amounts of the sulfuric acid being used at higher temperatures, and thereafter neutralizing the sulfuric acid, thereby stabilizing the resulting alkylate containing 6-tertiary butyl ortho-cresol against rearrangement to form 4-tertiary butyl ortho-cresol, and recovering at least one-half mol of 6-tertiary butyl ortho-cresol for each mol of ortho-cresol consumed in the process.

2. The method of claim 1 in which the isobutylene is contacted with the ortho-cresol at a pressure from 1 atmosphere to about the minimum pressure required for maintaining isobutylene in the liquid phase at the reaction temperature.

References Cited in the file of this patent

UNITED STATES PATENTS

| | | |
|---|---|---|
| 2,107,060 | Olin | Feb. 1, 1938 |
| 2,560,666 | Stevens et al. | July 17, 1951 |